(12) United States Patent
Shapur et al.

(10) Patent No.: US 10,645,163 B2
(45) Date of Patent: May 5, 2020

(54) SITE-AWARE CLUSTER MANAGEMENT

(71) Applicant: Hewlett Packard Enterprise Development LP, Houston, TX (US)

(72) Inventors: Srinivas Krishnappa Shapur, Bangalore Karnataka (IN); Gandham Satish Kumar, Bangalore Karnataka (IN); Deepa M Kini, Bangalore Karnataka (IN); Shashank Mohanrao Admane, Bangalore Karnataka (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 119 days.

(21) Appl. No.: 15/283,372

(22) Filed: Oct. 1, 2016

(65) Prior Publication Data
US 2017/0099203 A1    Apr. 6, 2017

(30) Foreign Application Priority Data

Oct. 1, 2015    (IN) .......................... 5284/CHE/2015

(51) Int. Cl.
*H04L 12/26* (2006.01)
*H04L 29/08* (2006.01)
*G06F 11/20* (2006.01)

(52) U.S. Cl.
CPC ........ *H04L 67/1097* (2013.01); *G06F 11/203* (2013.01); *H04L 43/00* (2013.01); *H04L 67/1034* (2013.01)

(58) Field of Classification Search
USPC ........................................................ 709/224
See application file for complete search history.

(56) References Cited

U.S. PATENT DOCUMENTS

| | | | | |
|---|---|---|---|---|
| 7,613,749 B2 * | 11/2009 | Flynn, Jr. | ............ | G06F 11/1662 |
| 8,898,507 B1 | 11/2014 | Crable et al. | | |
| 9,047,247 B2 | 6/2015 | Okada et al. | | |
| 2005/0256972 A1 * | 11/2005 | Cochran | ............. | G06F 11/2071 |
| | | | | 709/245 |
| 2007/0168500 A1 * | 7/2007 | D'Souza | ............. | G06F 17/3056 |
| | | | | 709/224 |

(Continued)

FOREIGN PATENT DOCUMENTS

WO    WO-2004023620 A1    3/2004

OTHER PUBLICATIONS

Wie Dong Zhu, Content Manager OnDemand Backup, Recovery, and High Availability, IBM.Com Redbooks, First Version, p. 20-22 and 148, Oct. 2005 (Year: 2005).*

(Continued)

*Primary Examiner* — James A Edwards
(74) *Attorney, Agent, or Firm* — Hewlett Packard Enterprise Patent Department (57) ABSTRACT

The present subject matter relates to management of site-aware cluster of a data storage system. In an example implementation, a workload manager is hosted on a node of a secondary site in the site-aware cluster for managing an application workload of a primary site in the site-aware cluster. When the primary site is subjected to failure, the application workload is shifted from the primary site to the secondary site by the workload manager.

16 Claims, 5 Drawing Sheets

(56) References Cited

U.S. PATENT DOCUMENTS

2013/0036091 A1\* 2/2013 Provenzano .......... G06F 3/0604
707/624
2015/0113537 A1\* 4/2015 Bourbonnais ......... G06F 9/5083
718/103

OTHER PUBLICATIONS

Disaster Recovery and High Availability for Azure Applications—Search Results, Retrieved Sep. 30, 2016, 33 Pgs.
Disaster Tolerant Wolfpack Geo-clusters—Search Results, Retrieved Sep. 30, 2016, 2 Pgs.

\* cited by examiner

SITE-AWARE CLUSTER MANAGEMENT

BACKGROUND

A site-aware cluster of a data storage system includes a cluster of nodes distributed across a primary site and a secondary site. The primary site and the secondary site may be located at different geographical locations. The primary site is an active site having one or more nodes where an application workload may actively run depending on accessing of applications by users. The secondary site is a standby site having one or more nodes where the application workload can be shifted to, or failed over, in case the primary site is subjected to failure.

BRIEF DESCRIPTION OF DRAWINGS

The following detailed description references the drawings, wherein.

DETAILED DESCRIPTION

A data storage system can be made failure tolerant by realizing the data storage system using a site-aware cluster. In the site-aware cluster, nodes of the data storage system are segregated and assigned across two geographically separated sites. One of the two geographically separated sites is referred to as a primary site having one or more nodes where an application workload may actively run. The other site is referred to as a secondary site having one or more nodes where the application workload can be failed over in case the primary site is subjected to failure. A site may experience a failure when the nodes of the site shutdown, for example, due to a power outage, a disaster, such as an earthquake, flood, etc. A site may also experience a failure when the application workload running on a node of the site fails. The nodes may include servers, virtual machines, and such, which may host data for applications accessed by users. The application workload may be a set of dependent or independent application components which may have to be running for the applications to be available for the users.

The site-aware cluster includes a workload manager that may perform a variety of operations in order to keep the application workload up and running. The workload manager may perform operations such as starting up of a new application workload, pausing of the application workload, and monitoring of the application workload. In addition to such operations, the workload manager may operate to failover the application workload from the primary site to the secondary site when the primary site is subjected to failure.

Generally, in the site-aware cluster, the workload manager is hosted on the primary site where the application workload runs actively. In such a situation, when the primary site experiences a failure, the workload manager is failed over to the secondary site, prior to failing over the application workload to the secondary site. The failing over of the workload manager, in addition to failing over of the application workload, adds to the recovery time objective (RTO). The RTO refers to the time taken for bringing up the application workload at the secondary site from the primary site during a failure. A higher RTO results in an increase in the downtime of the applications being accessed by the users.

The present subject matter describes methods and systems for managing a site-aware cluster of a data storage system. The methods and the systems of the present subject matter facilitate in reducing the RTO when a primary site of the site-aware cluster is subjected to failure.

In accordance with an example implementation of the present subject matter, a workload manager is hosted on a node of a secondary site in the site-aware cluster, while an application workload is running on the primary site. By hosting the workload manager at the secondary site, in case when the primary site is subjected to failure, the application workload is failed over to the secondary site without requiring the workload manager to failover. Since the workload manager is already available at the secondary site and is not to be failed over, the RTO is effectively reduced to the time taken by the application workload to failover from the primary site to the secondary site. Reduction of the RTO helps in reducing the downtime of applications, thereby improving the user experience of accessing the applications during a failure.

Further, by hosting the workload manager at the secondary site while the application workload is running on the primary site, in case when the secondary site is subjected to failure, the workload manager alone is failed over from the secondary site to the primary site. The failover of the workload manager from the secondary site does not impact any of the applications running on the primary site, and thus does not affect user experience of accessing the applications.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Figure 1:
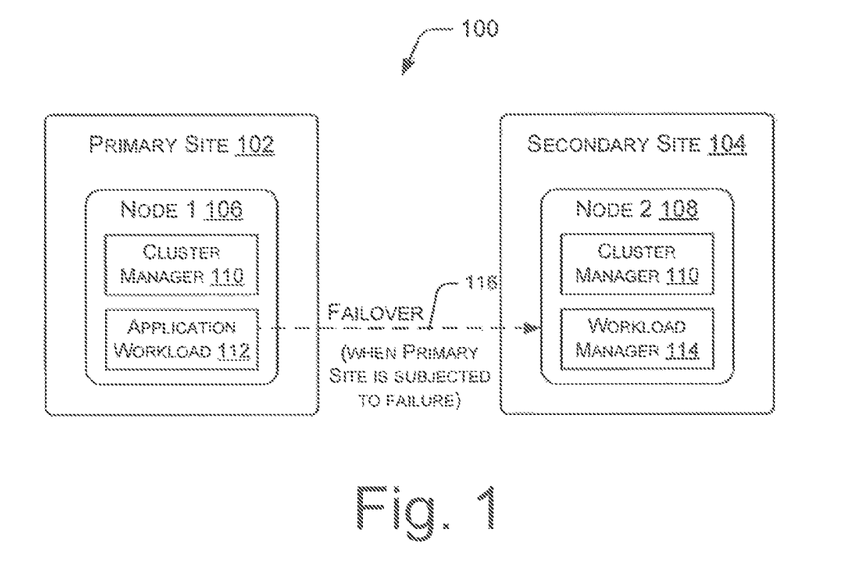
FIG. 1 illustrates a site-aware cluster, according to an example implementation of the present subject matter.

FIG. 1 illustrates a site-aware cluster 100, according to an example implementation of the present subject matter. The site-aware cluster 100 has a primary site 102 and a secondary site 104. As shown in FIG. 1, the primary site 102 includes node 1, referenced by 106, which may host data (not shown) based on which user can access various applications. Similarly, the secondary site 104 includes node 2, referenced by 108, which may host the same data (not shown) as hosted by node 1 106 for accessing of the applications by users. Node 1 106 and node 2 108 may include, for example, servers or virtual machines. It may be noted that, for the sake of simplicity, only one node is shown in each of the primary site 102 and the secondary site 104 in the site-aware cluster 100; however, each of the primary site 102 and the secondary site 104 may include more than one node, and the data for accessing the applications may be hosted across multiple nodes at the site.

Further, as shown in FIG. 1, a cluster manager 110 resides in each of node 1 106 and node 2 108. The cluster manager 110 in a node assigns the node to the primary site 102 or the secondary site 104 and is aware of the site to which the node belongs, for realizing the site-aware cluster. The cluster manager may assign the node to a site based on user inputs. In the example implementation shown in FIG. 1, the cluster manager 110 in node 1 106 assigns node 1 106 to the primary site 102, and the cluster manager 110 in node 2 108 assigns node 2 108 to the secondary site 104. The cluster manager 110 in node 1 106 may store an identifier associated with the primary site 102 to be aware that node 1 106 is assigned to the primary site 102. Similarly, the cluster manager 110 in node 2 108 may store an identifier associated with the secondary site 104 to be aware that node 2 108 is assigned to the secondary site 104.

Further, in the site-aware cluster 100, the primary site 102 is an active site on which the users may actively access the applications, and the secondary site 104 is a standby or backup site which may be utilized when the primary site 102 is subjected to failure. With the primary site 102 being the active site, an application workload 112 for the applications being accessed by the users is hosted and run on node 1 106. The application workload 112 may include dependent or independent application components which have to be running for the applications to be available for the users. In an example implementation, where the primary site 102 includes more than one node, the application workload 112 may be distributed across multiple nodes of the primary site 102.

The users may access various applications on the primary site 102 using their user devices (not shown). The user devices may communicate with node 1 106 over a communication network (not shown) for the purpose of accessing the applications on the primary site 102. The communication network may be a wireless network, a wired network, or a combination thereof. The communication network can also be an individual network or a collection of many such individual networks, interconnected with each other and functioning as a single large network, e.g., the Internet or an intranet. The communication network can be implemented as one of the different types of networks, such as intranet, local area network (LAN), wide area network (WAN), and the internet. The communication network may either be a dedicated network or a shared network, which represents an association of the different types of networks that use a variety of protocols, for example, Hypertext Transfer Protocol (HTTP) and Transmission Control Protocol/Internet Protocol (TCP/IP), to communicate with each other.

In an example implementation, the user devices and node 1 106 may be communicatively coupled over the communication network through one or more communication links. The communication links are enabled through a desired form of communication, for example, via dial-up modem connections, cable links, and digital subscriber lines (DSL), wireless or satellite links, or any other suitable form of communication. In an example implementation, the user devices may be directly coupled to node 1 106. Although the communication of the user devices is described with respect to node 1 106, it may be noted that the user devices can also communicate with node 2 108 over the communication network in a similar manner.

Further, as shown in FIG. 1, node 2 108 hosts a workload manager 114 for managing the application workload 112 running on node 1 106. The workload manager 114 operates to start, stop, or pause the application workload 112 depending on accessing of applications by the users. The workload manager 114 also operates to monitor the health and status of the application workload 112 running on node 1 106. In case an application component associated with the application workload 112 experiences a failure, the workload manager 114 may start a new application component to keep the application workload 112 running. In an example implementation, the workload manager 114 may communicate with node 1 106 over the communication network for the purpose of managing the application workload 112 at node 1 106.

Each of node 1 106 and node 2 108, respectively, includes one or more processors (not shown). The cluster manager 110, the application workload 112, and the workload manager 114 are coupled to the processor(s) of node 1 or node 2 to perform respective functions associated with managing the nodes in the site-aware cluster 100, and running and managing the application workload 112, in accordance with the present subject matter.

The processor(s) may be implemented as microprocessors, microcomputers, microcontrollers, digital signal processors, central processing units, state machines, logic circuitries, and/or any devices that manipulate signals based on operational instructions. Among other capabilities, the processor(s) may fetch and execute computer-readable instructions stored in a memory coupled to the processor(s) of node 1 and node 2. The memory can be internal or external to node 1 and node 2. The memory may include any non-transitory computer-readable storage medium including, for example, volatile memory (e.g., RAM), and/or non-volatile memory (e.g., EPROM, flash memory, NVRAM, memristor, etc.).

The description below describes the procedure of managing the site-aware cluster 100, particularly, for keeping the application workload 112 running and recovering the application workload 112 efficiently in case of a failure, in accordance with an example implementation of the present subject matter. It may be noted that any of the primary site 102 or the secondary site 104 may experience a failure wherein node 1 106 or node 2 108 may shutdown. In an example, the failure may be due to a power outage, or a disaster, such as an earthquake, flood, etc. In an example, the primary site 102 may fail due to failure of the application workload running on a node of the primary site 102.

For managing the site-aware cluster 100, the cluster manager 110 at node 1 106 gathers heartbeat signals from the node 1 106, and determines availability of nodes 1 106 based on the received heartbeat signals. Similarly, the cluster manager 110 at node 2 108 gathers heartbeat signals from the node 2 108, and determines availability of node 2 108 based on the received heartbeat signals. The cluster managers 110 at nodes 1 and 2 communicate with each other to share information of availability of their respective host node, such that the cluster manager 110 at each of nodes 1 and 2 is aware of availability of both nodes 1 and 2. Further, the workload manager 114 communicates with the cluster manager 110 at each of nodes 1 and 2 to determine availability of respective nodes 1 and 2. The cluster managers 110 and the workload manager 114 may communicate with each other over the communication network. It may be noted that node 1 may not be available if node 1 experiences shutdown due to a power outage, a disaster, etc. Similarly, node 2 may not be available if node 2 experiences shutdown due to a power outage, a disaster, etc. If node 1 is not available, then the cluster manager 110 in node 2 and the workload manager 114 determine that the primary site 102 is subjected to failure. If node 2 is not available, then the cluster manager 110 in node 1 determines that the secondary site 104 is subjected to failure. In an example implementation, the workload manager 114, monitoring the application workload 112, may determine that the primary site 102 is subjected to failure when the application workload 112 running on node 1 fails.

On determining that node 1 is not available and the primary site 102 is subjected to failure, the workload manager 114 fails over the application workload 112 from the primary site 102 to the secondary site 104. The application workload 112 is failed over from node 1 106 to node 2 108, as depicted by arrow 116 in FIG. 1. With this, the RTO, i.e., the time taken to bring or recover the application workload 112 to the secondary site 104 is substantially equal to the time taken for failing over the application workload 112. Once the application workload 112 is brought to the secondary site 104, the users are able to access the applications through the secondary site 104. It may be noted that, in an example implementation where each of the primary site 102 and the secondary site 104 includes more than one node, the application workload 112 distributed across on multiple nodes at the primary site 102 is failed over to one or more nodes at the secondary site 104.

Figure 2:
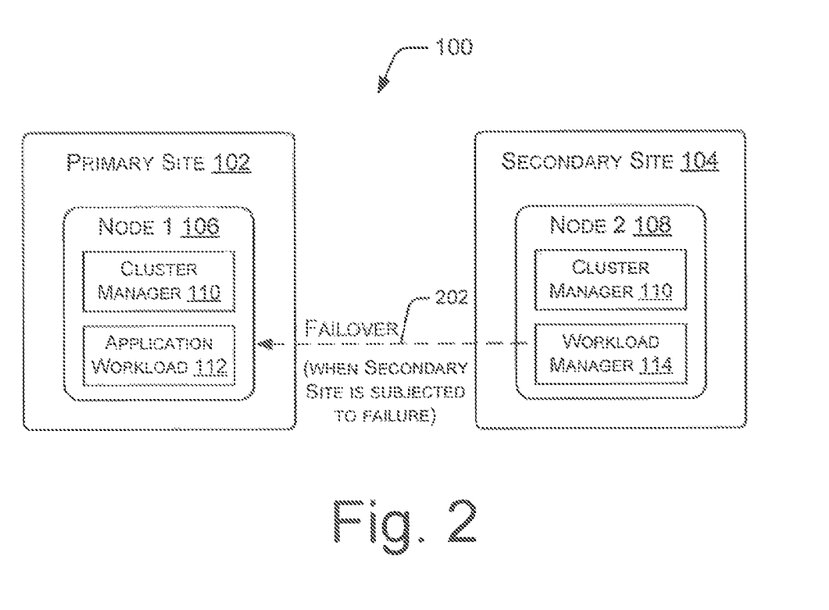
FIG. 2 illustrates a site-aware cluster, according to an example implementation of the present subject matter.

In an example implementation, on determining that node 2 108 is not available and the secondary site 104 is subjected to failure, the cluster manager 110 residing in node 1 106 fails over the workload manager 114 from the secondary site 104 to the primary site 102. FIG. 2 illustrates the site-aware cluster 100, in accordance with an example implementation of the present subject matter, where arrow 202 depicts failover of the workload manager 114 from node 2 108 to node 1 106 when the secondary site 104 is subjected to failure. The failover of the workload manager 114 to the primary site 102 does not impact the user experience of accessing the applications through the primary site 102.

Further, in an example implementation, the primary site 102, if subjected to failure, may be recovered or restored from failure in some time. Once the primary site 102 is recovered, the cluster manager 110 and the workload manager 114 in node 2 108 may determine that node 1 106 is available. On determining that the primary site 102 is recovered after the failure and node 1 is available, the cluster manager 110 in node 2 or in node 1 may transfer the workload manager 114 from the secondary site 104 to the primary site 102, keeping the application workload 112 at the secondary site 104. The workload manager 114 is failed over in this situation, since the failing over of the workload manager 114 does not affect accessing of the applications by the users. It may be noted that by failing over the workload manager 114 alone to the primary site 102 the roles of the primary site 102 and the secondary site 104 are reversed. The secondary site 104 is operated as a primary site, and the primary site 102 is operated as a secondary site.

In an example implementation, the secondary site 104, if subjected to failure, may be recovered or restored from failure in some time. Once the secondary site 104 is recovered, the cluster manager 110 and the workload manager 114 may determine that node 2 is available. On determining that the secondary site 104 is recovered after the failure and node 2 is available, the cluster manager 110 in node 1 or in node 2 may transfer the workload manager 114 from the primary site 102 to the secondary site 104, keeping the application workload 112 at the primary site 102.

Figure 3:
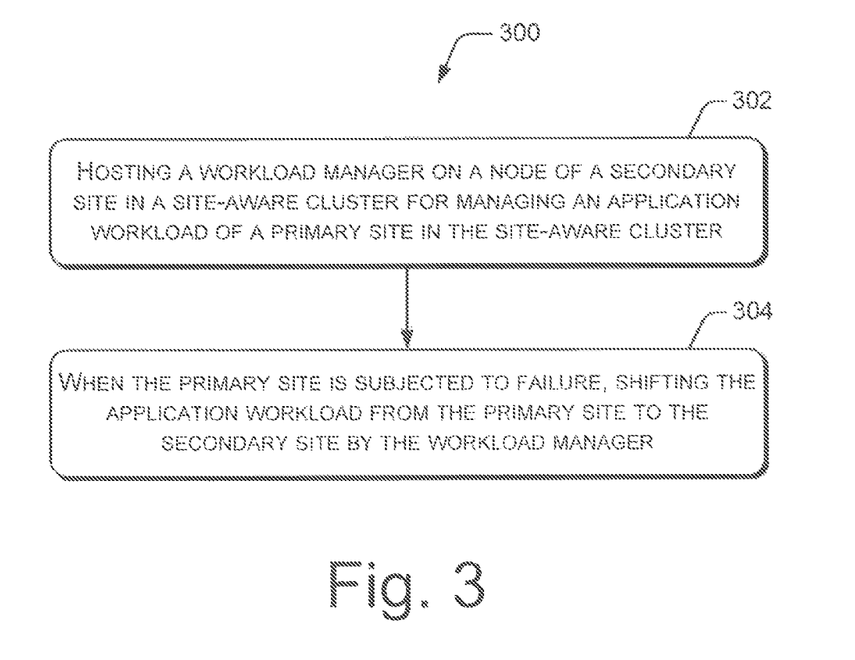
FIG. 3 illustrates a method for managing a site-aware cluster, according to an example implementation of the present subject matter.

FIG. 3 illustrates a method 300 for managing a site-aware cluster, according to an example implementation of the present subject matter. The method 300 can be implemented by processor(s) or computing device(s) through any suitable hardware, a non-transitory machine readable medium, or combination thereof. Further, although the method 300 is described in context of the aforementioned nodes of the primary site 102 and the secondary site 104 in the site-aware cluster 100, other suitable computing devices or systems may be used for execution of the method 300. It may be understood that processes involved in the method 300 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 3, at block 302, a workload manager is hosted on a node of the secondary site 104 in the site-aware cluster 100. The workload manager, hosted on the node of the secondary site 104, is to manage an application workload of the primary site 102 in the site-aware cluster 100. The workload manager in the secondary site 104 may communicate with a node of the primary site 102 over a communication network for managing the application workload.

At block 304, the application workload is shifted, or failed over, from the primary site 102 to the secondary site 104 by the workload manager, when the primary site 102 is subjected to failure. Since the workload manager is available at the secondary site 104, the application workload alone is shifted from the primary site 102 to the secondary site 104. This helps in effectively reducing RTO for recovering or bringing up the application workload at the secondary site 104.

Further, in an example implementation, when the primary site 102 is recovered after the failure, the workload manager is transferred from the secondary site 104 to the recovered primary site 102. The workload manager may be transferred by a cluster manager residing at the primary site 102 or at the secondary site 104. The application workload remains at the secondary site 104. Once the workload manager is transferred to the primary site 102, the secondary site 104 is operated as a primary site and the original primary site 102 is operated as a secondary site.

Figure 4:
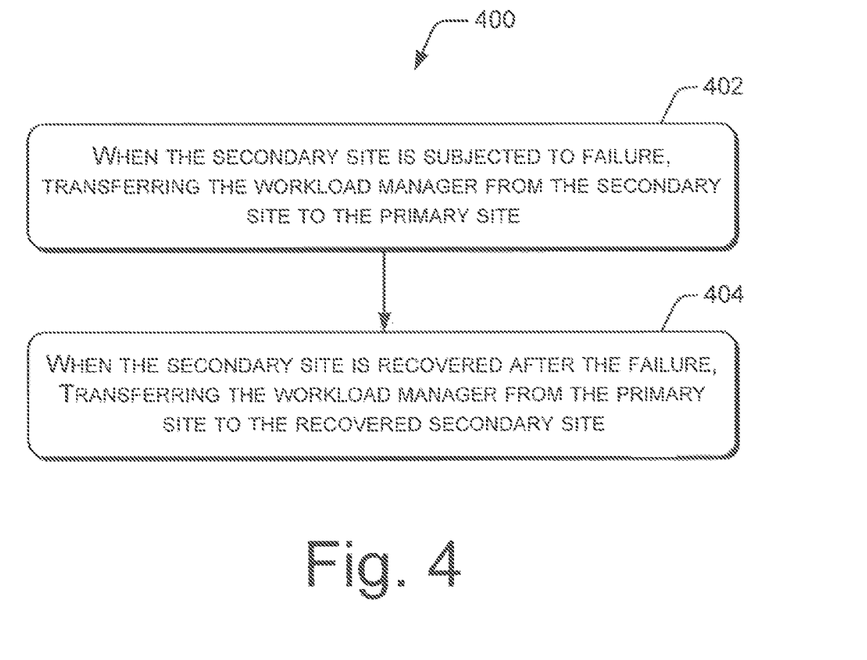
FIG. 4 illustrates a method for managing a site-aware cluster, according to an example implementation of the present subject matter.

FIG. 4 illustrates a method 400 for managing a site-aware cluster, according to an example implementation of the present subject matter. The method 400 can be implemented by processor(s) or computing device(s) through any suitable hardware, a non-transitory machine readable medium, or combination thereof. Further, although the method 400 is described in context of the aforementioned nodes of the primary site 102 and the secondary site 104 in the site-aware cluster 100, other suitable computing devices or systems may be used for execution of the method 400. It may be understood that processes involved in the method 400 can be executed based on instructions stored in a non-transitory computer readable medium, as will be readily understood. The non-transitory computer readable medium may include, for example, digital memories, magnetic storage media, such as a magnetic disks and magnetic tapes, hard drives, or optically readable digital data storage media.

Referring to FIG. 4, at block 402, the workload manager is transferred from the secondary site 104 to the primary site 102, when the secondary site 104 is subjected to failure. The workload manager may be transferred to the primary site 102 by a cluster manager residing at the primary site 102.

Further, at block 404, when the secondary site 104 is recovered after the failure, the workload manager is transferred from the primary site 102 to the recovered secondary site 104. The workload manager may be transferred by a cluster manager residing at the primary site 102 or at the secondary site 104. The application workload remains at the primary site 102.

Figure 5:
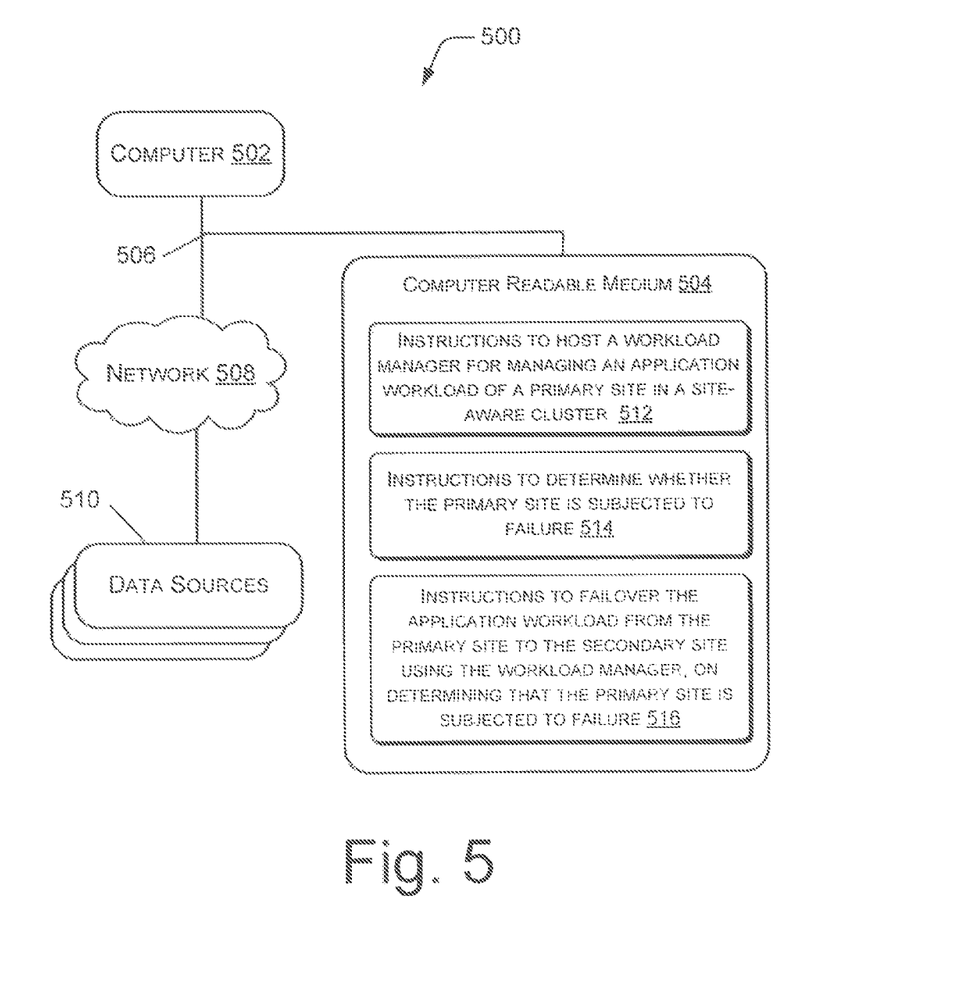
FIG. 5 illustrates a network environment for managing a site-aware cluster in a data storage system, according to an example implementation of the present subject matter.

FIG. 5 illustrates a network environment 500 for managing a site-aware cluster in a data storage system, according to an example implementation of the present subject matter. The network environment 500 may be a public networking environment or a private networking environment associated with a site-aware cluster of a data storage system. In an example implementation, the network environment 500 includes a computer 502 communicatively coupled to a non-transitory computer readable medium 504 through a communication link 506. In an example, the computer 502 may be a node of a secondary site in the site-aware cluster and has one or more processing resources for fetching and executing computer-readable instructions from the non-transitory computer readable medium 504.

The non-transitory computer readable medium 504 can be, for example, an internal memory device or an external memory device. In an example implementation, the communication link 506 may be a direct communication link, such as any memory read/write interface. In another example implementation, the communication link 506 may be an indirect communication link, such as a network interface. In such a case, the computer 502 can access the non-transitory computer readable medium 504 through a network 508. The network 508 may be a single network or a combination of multiple networks and may use a variety of different communication protocols.

The computer 502 and the non-transitory computer readable medium 504 may also be communicatively coupled to data sources 510 over the network 508. The data sources 510 can include, for example, nodes of a primary site of the site-aware cluster. The data sources 510 can also include user devices through which users can access the computer 502.

In an example implementation, the non-transitory computer readable medium 504 includes a set of computer readable instructions for managing the site-aware cluster. The set of computer readable instructions can be accessed by the computer 502 through the communication link 506 and subsequently executed to perform acts for managing the site-aware cluster.

Referring to FIG. 5, in an example, the non-transitory computer readable medium 504 includes instructions 512 that cause the computer 502 to host a workload manager for managing an application workload of a primary site in the site-aware cluster. The non-transitory computer readable medium 504 includes instructions 514 that cause the computer 502 to determine whether the primary site is subjected to failure, and instructions 516 that cause the computer 502 to failover the application workload from the primary site to the secondary site using the workload manager, on determining that the primary site is subjected to failure.

In an example implementation, the non-transitory computer readable medium 504 may further include instructions that cause the computer 502 to transfer the workload manager from the secondary site to the primary site, on determining that the primary site is recovered after the failure. In an example implementation, the non-transitory computer readable medium 504 may further include instructions that cause the computer 502 to transfer the workload manager from the primary site to the secondary site, on determining that the secondary site is recovered after a failure.

Although implementations for managing a site-aware cluster of a data storage system have been described in language specific to structural features and/or methods, it is to be understood that the present subject matter is not limited to the specific features or methods described. Rather, the specific features and methods are disclosed and explained as example implementations for managing a site-aware cluster of a data storage system.

We claim:

1. A method for managing a site-aware cluster of a data storage system, the method comprising:
    hosting a workload manager on a node of a secondary site in the site-aware cluster for managing an application workload operating at a primary site in the site-aware cluster, wherein the workload manager at the secondary site is to start, pause, and monitor an operation of the application workload operating at the primary site;
    when the primary site comprising a node is subjected to a failure, shifting the application workload from the primary site to the secondary site by the workload manager,
    wherein the node of the primary site and the node of the secondary site are segregated and assigned across at least two geographically separated sites; and
    when the primary site is recovered after the failure, transferring the workload manager from the secondary site to the recovered primary site while maintaining the application workload operating at the secondary site, wherein the transferred workload manager at the primary site is to manage, including starting, pausing, and monitoring, the application workload operating at the secondary site.

2. The method of claim 1, comprising:
    when the secondary site is subjected to a failure, transferring the workload manager from the secondary site to the primary site.

3. The method of claim 1, wherein the application workload operating at the primary site comprises a plurality of application components running at the primary site, the method further comprising:
    detecting, by the workload manager hosted on the node of the secondary site, a failure of a first application component of the plurality of application components running at the primary site, and
    starting, by the workload manager hosted on the node of the secondary site, another application component at the primary site in response to the detecting of the failure of the first application component.

4. The method of claim 1, wherein the transferring of the workload manager from the secondary site to the recovered primary site comprises transferring the workload manager from the secondary site to the recovered primary site over a network between the secondary site and the recovered primary site.

5. The method of claim 1, further comprising:
    monitoring, by a first cluster manager at the primary site, a heartbeat signal of the node of the primary site to determine availability of the node of the primary site;
    monitoring, by a second cluster manager at the secondary site, a heartbeat signal of the node of the secondary site to determine availability of the node of the secondary site; and
    communicating, by the workload manager with the first cluster manager and the second cluster manager, to determine by the workload manager availability of the node of the primary site and availability of the node of the secondary site.

6. The method of claim 5, wherein the transferring of the workload manager from the secondary site to the recovered primary site is performed by the first cluster manager or the second cluster manager.

7. A secondary site for a site-aware cluster that further comprises a primary site, the secondary site comprising:
- a first node comprising a processor and a non-transitory storage medium comprising a workload manager executable on the processor to:
  - manage an application workload on at least one node of the primary site, wherein the managing of the application workload comprises starting, pausing, and monitoring the application workload on the at least one node of the primary site; and
  - failover the application workload from the primary site to the secondary site in response to determining that the primary site is subjected to a failure,
- wherein the non-transitory storage medium of the first node of the secondary site further comprises instructions executable on the processor to transfer the workload manager from the secondary site to the primary site in response to determining that the primary site has recovered from the failure, while maintaining the application workload operating at the secondary site,
- wherein the application workload operating at the secondary site is subject to management by the transferred workload manager at the primary site.

8. The secondary site of claim 7, wherein the management of the application workload operating at the secondary site by the transferred workload manager at the primary site comprises starting, pausing, and monitoring the application workload operating at the secondary site.

9. The secondary site of claim 7, wherein the non-transitory storage medium of the first node of the secondary site further comprises a cluster manager executable on the processor to transfer the workload manager from the secondary site to the primary site in response to determining that the secondary site is subjected to a failure.

10. The secondary site of claim 9, wherein the cluster manager is executable on the processor to transfer the workload manager from the primary site to the secondary site in response to determining that the secondary site has recovered from the failure of the secondary site.

11. The secondary site of claim 7, wherein the application workload on the at least one node of the primary site comprises a plurality of application components on the at least one node of the primary site, wherein the workload manager is executable on the processor to:
- detect a failure of a first application component of the plurality of application components on the at least one node of the primary site; and
- cause starting of another application component on the at least one node of the primary site in response to the detecting of the failure of the first application component.

12. The secondary site of claim 7, wherein the transferring of the workload manager from the secondary site to the primary site comprises transferring the workload manager from the secondary site to the primary site over a network between the secondary site and the primary site.

13. A non-transitory computer-readable medium comprising computer-readable instructions, which, when executed by a computer node of a secondary site in a site-aware cluster, cause the computer node to:
- host a workload manager for managing an application workload operating at a primary site in the site-aware cluster, wherein the workload manager hosted on the computer node at the secondary site is to start, pause, and monitor an operation of the application workload at the primary site;
- determine whether the primary site is subjected to a failure;
- failover the application workload from the primary site to the secondary site using the workload manager upon determining that the primary site is subjected to the failure,
- wherein the computer node of the secondary site is to be geographically separated from a computer node of the primary site; and
- transfer the workload manager from the secondary site to the primary site upon determining that the primary site is recovered from the failure, while maintaining the application workload at the secondary site, wherein the application workload at the secondary site is subject to management by the workload manager transferred from the secondary site to the primary site.

14. The non-transitory computer-readable medium of claim 13, wherein the computer-readable instructions when executed cause the computer node of the secondary site to:
- transfer the workload manager from the secondary site to the primary site upon determining that the secondary site is subject to a failure.

15. The non-transitory computer-readable medium of claim 13, wherein the application workload operating at the primary site comprises a plurality of application components running at the primary site, and wherein the computer-readable instructions when executed cause the computer node of the secondary site to:
- detect, by the workload manager hosted by the computer node of the secondary site, a failure of a first application component of the plurality of application components at the primary site; and
- start, by the workload manager hosted by the computer node of the secondary site, another application component at the primary site in response to the detecting of the failure of the first application component.

16. The non-transitory computer-readable medium of claim 13, wherein the transferring of the workload manager from the secondary site to the primary site comprises transferring the workload manager from the secondary site to the primary site over a network between the secondary site and the primary site.

* * * * *